(12) United States Patent
Gardynik et al.

(10) Patent No.: US 11,186,148 B2
(45) Date of Patent: Nov. 30, 2021

(54) AUTOMOTIVE PANEL HEM STABILIZING ASSEMBLY AND METHOD

(71) Applicant: Ford Global Technologies, LLC, Dearborn, MI (US)

(72) Inventors: Michael J Gardynik, Farmington Hills, MI (US); Steven Frank, Dearborn, MI (US); Kevin Joseph Favero, Plymouth, MI (US); Michael Joseph Lee, Ann Arbor, MI (US); Ronald Machin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 16/668,037

(22) Filed: Oct. 30, 2019

(65) Prior Publication Data

US 2021/0129637 A1    May 6, 2021

(51) Int. Cl.
*B60J 5/04* (2006.01)

(52) U.S. Cl.
CPC ........... *B60J 5/0463* (2013.01); *B60J 5/0413* (2013.01); *B60J 5/0415* (2013.01); *B60J 5/0469* (2013.01)

(58) Field of Classification Search
CPC ...... B60J 5/0463; B60J 5/0413; B60J 5/0415; B60J 5/0469
USPC ....................................................... 296/146.5
See application file for complete search history.

(56) References Cited

U.S. PATENT DOCUMENTS

| 3,909,919 | A | * | 10/1975 | Miyabayashi | B21D 39/021 29/521 |
|---|---|---|---|---|---|
| 4,227,824 | A | * | 10/1980 | Ikawa | B60J 5/0469 403/271 |
| 5,237,734 | A | * | 8/1993 | Polon | B21D 39/02 29/243.58 |
| 6,029,334 | A | | 2/2000 | Hartley | |
| 6,528,176 | B1 | * | 3/2003 | Asai | B21D 39/021 29/521 |
| 8,632,118 | B2 | * | 1/2014 | Song | B23P 19/04 296/154 |
| 2009/0195013 | A1 | * | 8/2009 | Suzuki | B60R 13/04 296/146.5 |
| 2015/0145287 | A1 | * | 5/2015 | Harwin | B60R 13/06 296/193.07 |
| 2015/0353144 | A1 | * | 12/2015 | Faruque | B62D 33/02 403/345 |
| 2018/0141503 | A1 | * | 5/2018 | Cifra | B32B 7/04 |
| 2019/0176589 | A1 | * | 6/2019 | Choi | B60J 5/0469 |
| 2020/0215558 | A1 | * | 7/2020 | Dixon | B21D 28/24 |
| 2021/0146759 | A1 | * | 5/2021 | Gardynik | B60J 5/0413 |

FOREIGN PATENT DOCUMENTS

| CN | 106216533 A | 12/2016 |
|---|---|---|
| CN | 106270225 A | 1/2017 |
| KR | 101980553 B1 | 5/2019 |

* cited by examiner

*Primary Examiner* — Hilary L Gutman
(74) *Attorney, Agent, or Firm* — David Coppiellie, Esq.; Carlson, Gaskey & Olds, P.C.

(57) ABSTRACT

An automotive panel assembly includes, among other things, a first panel, a second panel, a flange of the first panel folded over an edge region of the second panel to hem together the first and second panel, and a dimple of the flange extending into an aperture within the edge region of the second panel. At least a portion of the aperture is exposed.

18 Claims, 4 Drawing Sheets ial application under 35 U.S.C. § 371 of PCT/US2017/064720 filed Dec. 5, 2017.

AUTOMOTIVE PANEL HEM STABILIZING ASSEMBLY AND METHOD

TECHNICAL FIELD

This disclosure relates generally to hemming of an automotive panel assembly and, more particularly to stabilizing hemmed areas when securing a first panel relative to a second panel.

BACKGROUND

An automotive panel assembly can include hemmed areas. After hemming, the automotive panel assembly can include a first panel folded over an edge of a second panel to couple together the first and second panels. Exemplary automotive panel assemblies can include body panels and closure panels, such as side doors, decklids, trunks, and hoods.

SUMMARY

An automotive panel assembly according to an exemplary embodiment of the present disclosure includes, among other things, a first panel, a second panel, a flange of the first panel folded over an edge region of the second panel to hem together the first and second panel, and a dimple of the flange extending into an aperture within the edge region of the second panel. At least a portion of the aperture is exposed.

In another example of the foregoing assembly, the aperture has a circumferentially continuous perimeter provided entirely by the edge region of the second panel.

In another example of any of the foregoing assemblies, the dimple of the flange directly contacts only a portion of the circumferentially continuous perimeter.

In another example of any of the foregoing assemblies, the edge region of the second panel extends to a second panel side edge. The flange of the first panel extends a first distance from the second panel side edge, and the aperture within the edge region extends a greater, second distance from the second panel side edge.

In another example of any of the foregoing assemblies, the flange extends to a first panel side edge. The dimple is at least partially formed within the first panel side edge.

In another example of any of the foregoing assemblies, the flange extends to a first panel side edge. A portion of the first panel side edge is disposed within the aperture.

In another example of any of the foregoing assemblies, contact between the dimple and at least one side of the aperture is configured to prevent movement of the first panel relative to the edge region.

In another example of any of the foregoing assemblies, the aperture is an ecoat drain hole.

In another example of any of the foregoing assemblies, the portion of the aperture that is exposed is not covered by the flange.

Another example of any of the foregoing assemblies includes adhesive joining the flange of the first panel to the edge region of the second panel.

In another example of any of the foregoing assemblies, the aperture has a polygonal perimeter.

In another example of any of the foregoing assemblies, the aperture has a diamond shaped perimeter profile. Also, the flange completely covers two of the edges of the diamond shaped perimeter. The remaining two edges of the diamond shaped perimeter are at least partially exposed.

In another example of any of the foregoing assemblies, the first panel is an outer panel and the second panel is an inner panel.

In another example of any of the foregoing assemblies, the outer panel is an outer door panel and the inner panel is an inner door panel.

In another example of any of the foregoing assemblies, a vehicle includes the automotive panel assembly.

An automotive panel hemming method according to an exemplary aspect of the present disclosure includes, among other thing, folding a flange of a first panel over an edge region of a second panel, and pressing a dimple of the flange into an aperture within the edge region. The portion of the aperture extends past the flange such that a portion of the aperture is exposed after the pressing.

In another example of the foregoing method, after the pressing, the dimple directly contacts a portion of a circumferentially continuous perimeter of the aperture, but does not directly contact the entire circumferentially continuous perimeter.

Another example of the foregoing method includes, after the pressing, curing an adhesive to hold the first panel relative to the second panel.

In another example of the foregoing method, the flange extends to a first panel side edge, and a portion of the first panel side edge is disposed within the aperture.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to hemming an automotive panel assembly. In particular, the disclosure is directed toward stabilizing a first panel relative to a second panel during a hemming process. The stabilizing can give an adhesive time to cure.

Figure 1:
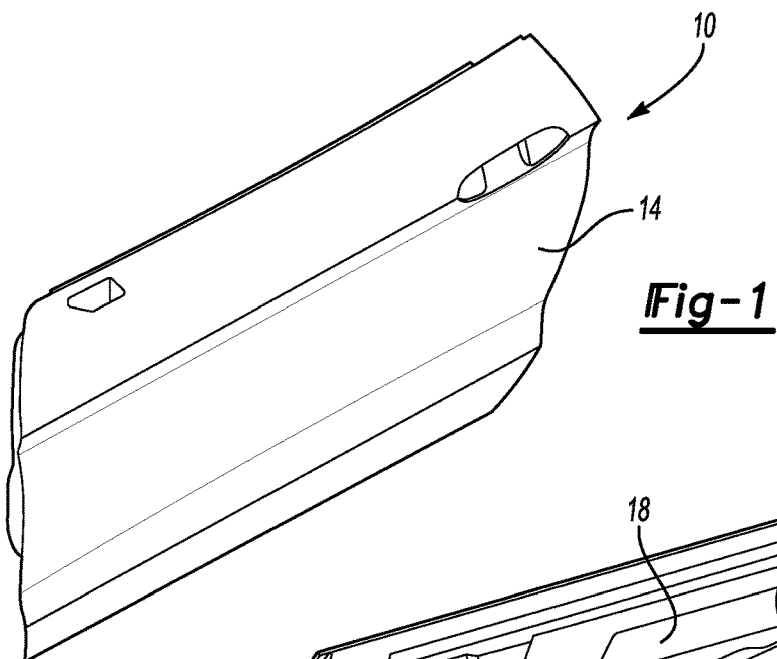
FIG. 1 illustrates a perspective view of an outer panel of an automotive panel assembly.
Figure 2:
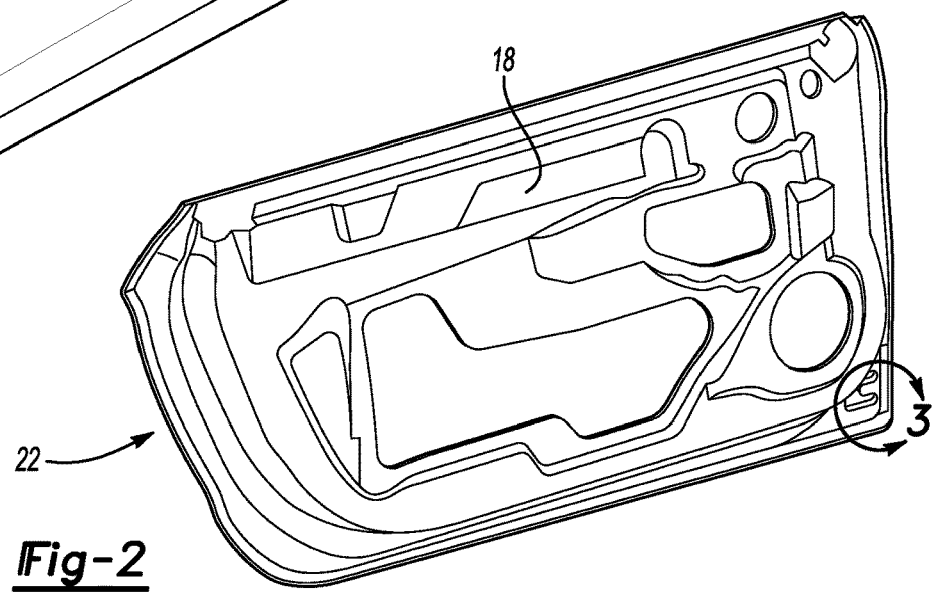
FIG. 2 illustrates a perspective view of an inner panel hemmed together with the outer panel of FIG. 1.

Referring to FIGS. 1 and 2, an automotive panel assembly 10, here a side door of a vehicle, includes a first, outer panel 14 and second, inner panel 18. The side door is considered a closure panel. In another example, the automotive panel assembly 10 could be another type of closure panel for the vehicle, such as a decklid, trunk, or hood. In still other examples, the automotive panel assembly 10 could be a body panel of the vehicle, such as a quarter panel or side panel.

The outer panel 14 and the inner panel 18 are secured together via a hem joint 22. In the exemplary embodiment, the hem joint 22 extends substantially continuously about a periphery of the automotive panel assembly 10. The hem joint 22, however, does not need to extend substantially continuously about the entire periphery. The hem joint 22 could, for example, extend only about a portion of the periphery.

With reference to FIGS. 3-6, the hem joint 22, in the exemplary embodiment, is disposed at a bottom forward edge of the automotive panel assembly 10. The hem joint 22 includes a flange 26 of the outer panel 14 folded over an edge region 30 of the inner panel 18. Folding the flange 26 over the edge region 30 captures the edge region 30 between the flange 26 and another portion of the outer panel 14.

Figure 3:
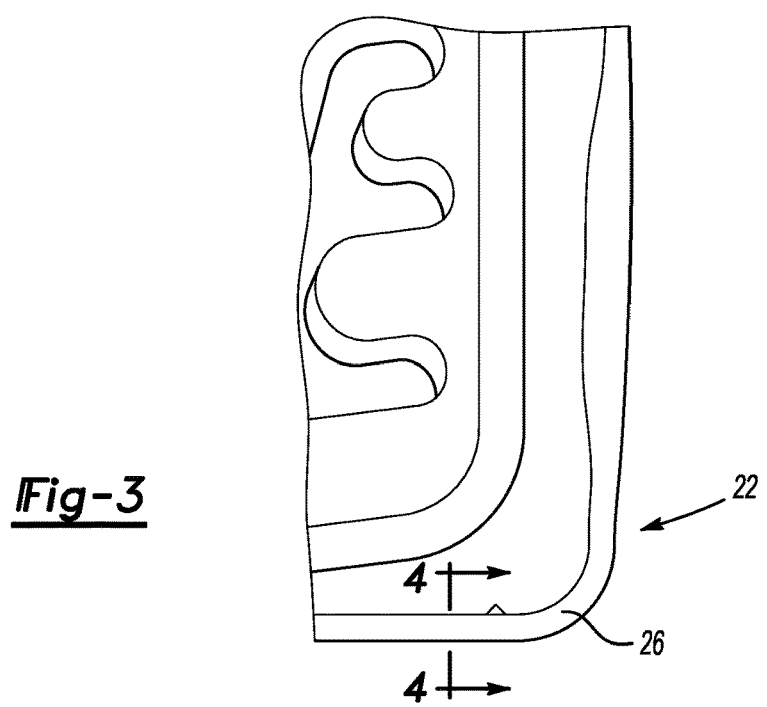
FIG. 3 illustrates a close-up view of Area 3 in FIG. 2.
Figure 4:
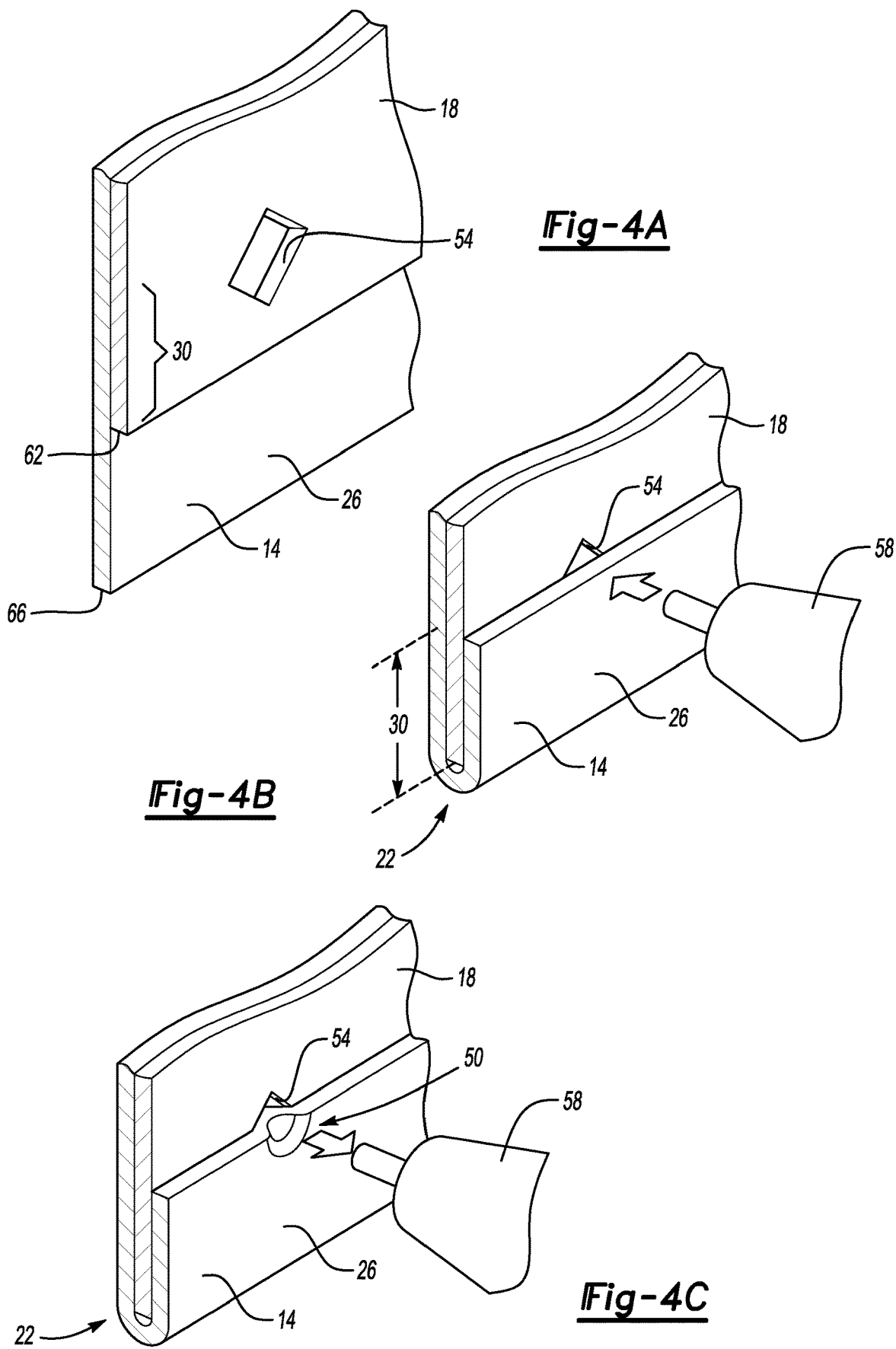
FIG. 4A illustrates a section view taken at line 4-4 in FIG. 3 during an early stage of hemming together the outer panel and the inner panel of FIGS. 1 and 2.
FIG. 4B illustrates the section view of FIG. 4A at a later stage of hemming together the outer panel and the inner panel.
FIG. 4C illustrates a section view of the area in FIG. 4A at an even later stage than that shown in FIG. 4B.

When in the final hemmed position of FIG. 3, adhesive A between the edge region 30 and the outer panel 14 holds the hem joint 22 together. The adhesive A can be a thermoset adhesive that is cured when the automotive panel assembly 10 exposed to a relatively high temperature environment, such as during a painting step of the assembly process. The adhesive A can be placed along interfaces I.

Figure 5:
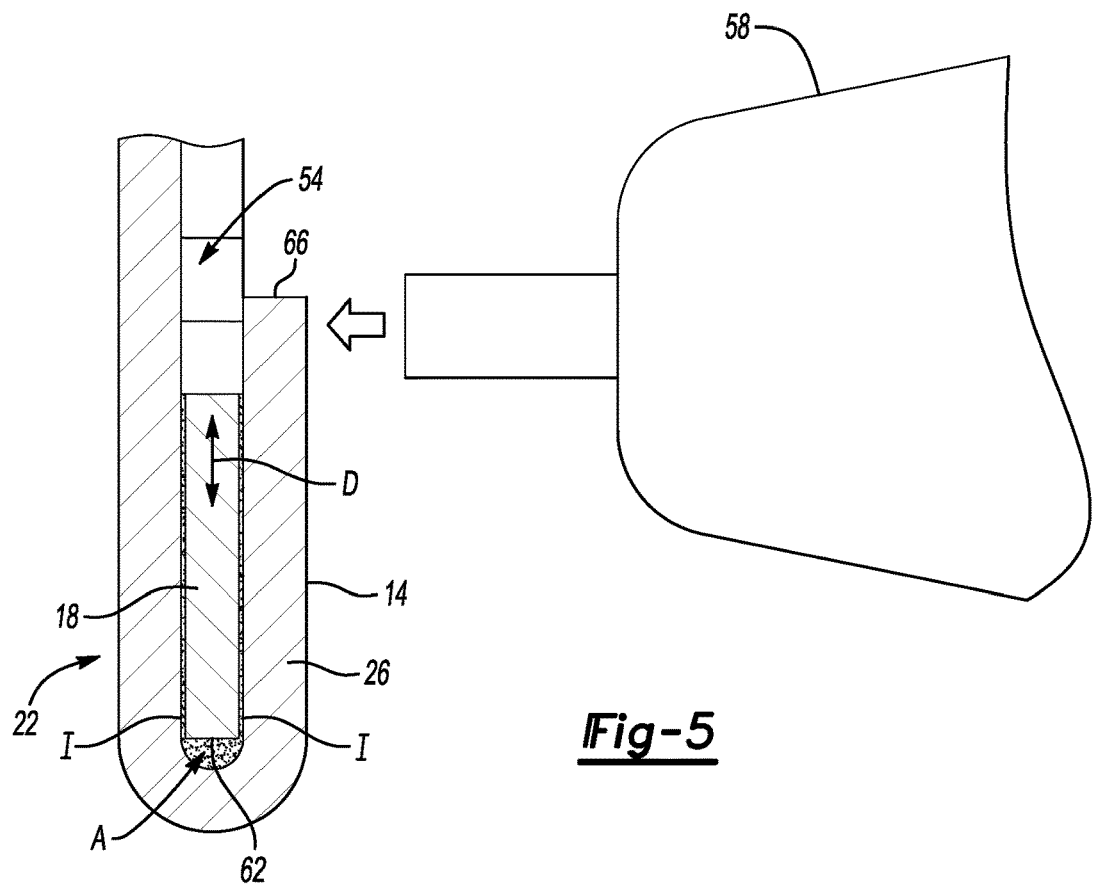
FIG. 5 illustrates a side view of the section shown in FIG. 4B.

Until the adhesive A cures, the adhesive A may act as a lubricant, which can potentially facilitate movement of the inner panel 18 relative to the outer panel 14 back and forth in the direction D (FIG. 5). As can be appreciated, such relative movement may lead to misalignment between the inner panel 18 and the outer panel 14, particularly in the areas of the hem joint 22. Further, if the inner panel 18 and outer panel 14 are misaligned, the adhesive A may then cure and undesirably hold the inner panel 18 and the outer panel 14 in a misaligned position.

The exemplary embodiment incorporates a hem stabilizing assembly utilized to substantially lock a position of the inner panel 18 relative to the outer panel 14 after folding the flange 26 over the edge region 30 of the inner panel 18. The hem stabilizing assembly can lock the position of the inner panel 18 relative to the outer panel 14 until adhesive A at the interfaces I cures and after adhesive A at the interfaces I cures.

The stabilizing assembly includes, in the exemplary embodiment, a dimple 50 of the flange 26. The dimple 50 extends at least partially into an aperture 54 provided within the edge region 30 of the inner panel 18. Extending the dimple 50 within the aperture 54 can prevent relative movement between the inner panel 18 and the outer panel 14 after folding the flange 26 over the edge region 30. A punch 58 can be used after the folding operation to form the dimple 50 within the flange 26. The dimple 50 could be formed in other ways in other examples.

Notably, even after forming the dimple 50 within the flange 26, the portion of the aperture 54 is exposed. Exposed, for purposes of this disclosure, means that the portion of the aperture 54 is not covered by the flange 26. Leaving the portion of the aperture 54 exposed can facilitate, among other things, aligning the punch 58 when forming the dimple 50. The punch 58 can be repositioned relatively easily to, for example, avoid read through on the outer panel 14 due to the forming of the dimple 50. Because a portion of the aperture 54 is exposed, the punch 58 only needs to be positioned relative to one side of the aperture 54 (rather than opposing sides) when making such adjustments. Further, build variations are more easily accommodated with only one side contacted.

The aperture 54 has a substantially continuous outer perimeter that is provided entirely, in the exemplary embodiment, by the edge region 30 of the inner panel 18. The dimple 50 notably directly contacts only a portion of the circumferentially continuous perimeter of the aperture 54. In this example, the contacted portion is a vertically lower portion of the aperture 54.

The edge region 30 of the inner panel 18 extends to, and terminates at, an inner panel side edge 62 (FIG. 5). The outer panel 14 extends to an outer panel side edge 66. When the flange 26 is folded over the edge region 30 and the dimple 50 is formed in the flange 26, the flange 26 extends a first distance $D_1$ from the inner panel 18 side edge 62. The aperture 54 extends a greater second distance $D_2$ from the inner panel side edge 62. This demonstrates that the aperture 54 includes a portion that is left uncovered as the flange 26 does not extend far enough to cover the entire aperture 54.

Figure 6:
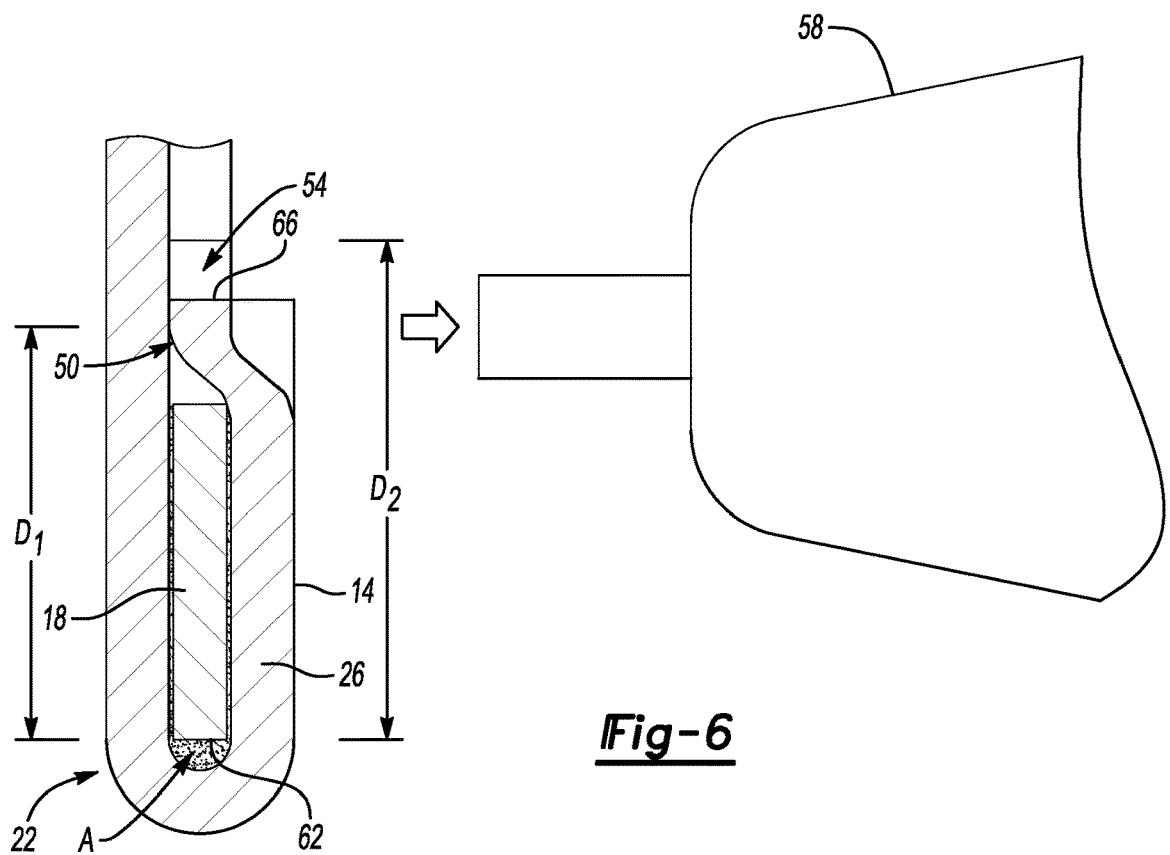
FIG. 6 illustrates a side view of the section shown in FIG. 4C.

The dimple 50 is formed at least partially by displacing an area of the first panel side edge 66, in the exemplary embodiment. This results in at least a portion of the outer panel side edge 66 being disposed within the aperture 54 (FIG. 6).

In the exemplary embodiment, the aperture 54 is an ecoat drain hole which can be used to communicate ecoat from between the inner panel 18 and the outer panel 14 after an ecoat dip. The automotive closure panel 10, thus, may not require an added machining operation is required to provide the aperture 54.

The aperture 54, in the exemplary embodiment, has a polynomial perimeter and, more specifically, has a diamond-shaped perimeter profile.

As shown in FIG. 4C, when the dimple 50 is formed within the flange 26, the flange 26 completely covers two sides of the diamond-shaped perimeter, a remaining two edges of the diamond-shaped perimeter are at least partially exposed.

Figure 7:
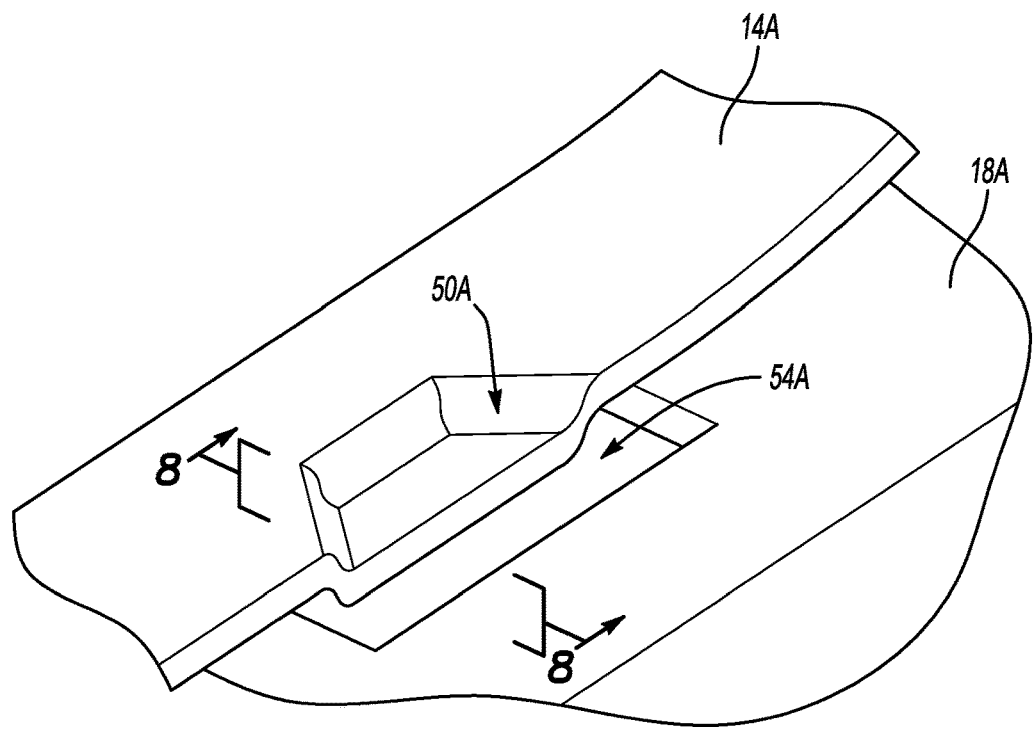
FIG. 7 illustrates a close-up view of an area of an inner panel hemmed together with an outer panel according to another exemplary aspect of the present disclosure.
Figure 8:
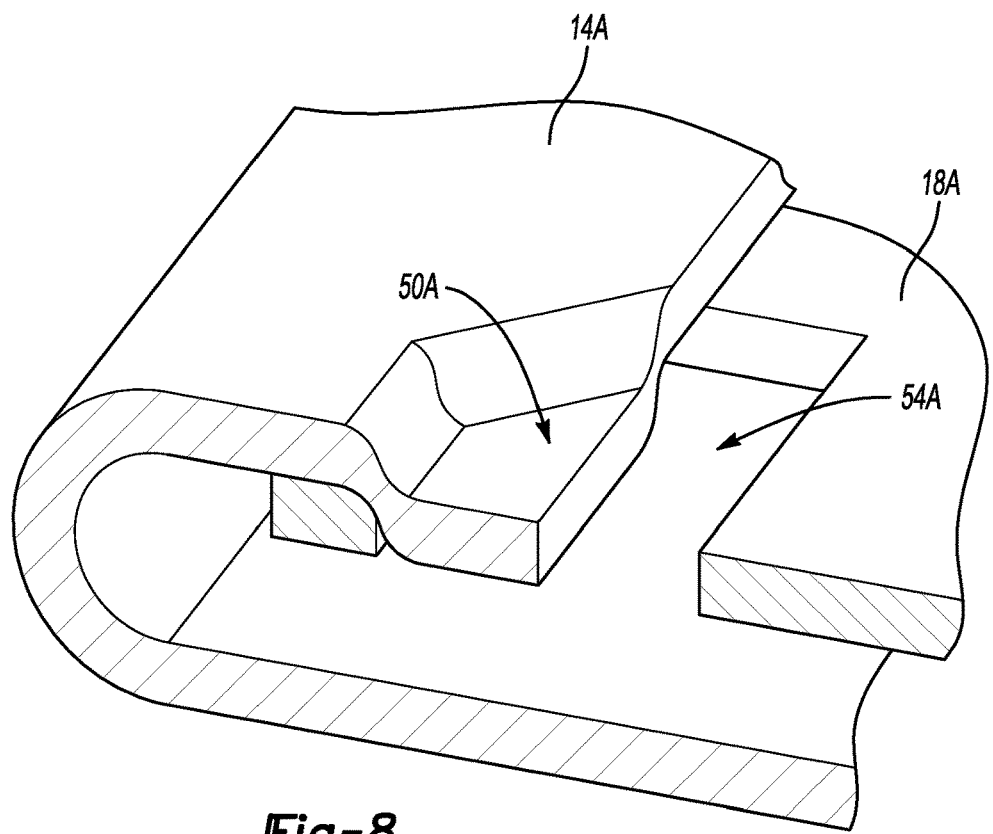
FIG. 8 illustrates a section view taken at line 8-8 in FIG. 7.

Other shapes for the aperture 54 and the dimple 50 are possible and fall within the scope of this disclosure. The other shapes could include square, rectangular, triangular, or hexagonal apertures. FIGS. 7 and 8, for example, show another dimple 50A that extends within an aperture 54A to stabilize a hem joint as adhesive at interfaces between an inner panel 18A and an outer panel 14A cures. The dimple 50A and the aperture 54A may be within an inner panel 18A and an outer panel 14A of a hood assembly, for example.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An automotive panel assembly, comprising:
a first panel;
a second panel;
a flange of the first panel folded over an edge region of the second panel to hem together the first and second panels; and
a dimple of the flange extending into an aperture within the edge region of the second panel, wherein at least a portion of the aperture is exposed, wherein the dimple is an area of a first panel side edge that is displaced into the aperture relative to another area of the first panel side edge;
wherein the flange extends to the first panel side edge, wherein a first portion of the first panel side edge is disposed within the aperture and a second portion of the first side edge is disposed outside the aperture.

2. The automotive panel assembly of claim 1, wherein the aperture has a circumferentially continuous perimeter provided entirely by the edge region of the second panel.

3. The automotive panel assembly of claim 2, wherein the dimple of the flange directly contacts only a portion of the circumferentially continuous perimeter.

4. The automotive panel assembly of claim 1, wherein the edge region of the second panel extends to a second panel side edge, wherein the flange of the first panel extends a first distance from the second panel side edge, and the aperture within the edge region extends a greater, second distance from the second panel side edge.

5. The automotive panel assembly of claim 1, wherein the flange extends to the first panel side edge, wherein the dimple is at least partially formed within the first panel side edge.

6. The automotive panel assembly of claim 5, wherein contact between the dimple and at least one side of the aperture is configured to prevent movement of the first panel relative to the edge region.

7. The automotive panel assembly of claim 5, wherein the aperture is an ecoat drain hole.

8. The automotive panel assembly of claim 5, wherein the portion of the aperture that is exposed is not covered by the flange.

9. The automotive panel assembly of claim 5, further comprising adhesive joining the flange of the first panel to the edge region of the second panel.

10. The automotive panel assembly of claim 5, wherein the aperture has a polygonal perimeter.

11. The automotive panel assembly of claim 9, wherein the aperture has a diamond shaped perimeter profile, wherein the flange completely covers two of the edges of the diamond shaped perimeter, the remaining two edges of the diamond shaped perimeter at least partially exposed.

12. The automotive panel assembly of claim 5, wherein the first panel is an outer panel and the second panel is an inner panel.

13. The automotive panel assembly of claim 12, wherein the outer panel is an outer door panel and the inner panel is an inner door panel.

14. A vehicle including the automotive panel assembly of claim 5.

15. An automotive panel hemming method, comprising:
folding a flange of a first panel over an edge region of a second panel; and
after the folding, pressing a dimple of the flange into an aperture within the edge region, the dimple formed during the pressing, wherein the portion of the aperture extends past the flange such that a portion of the aperture is exposed after the pressing;
wherein the flange extends to a first panel side edge, wherein a first portion of the first panel side edge is disposed within the aperture and a second portion of the first panel side edge is disposed outside the aperture.

16. The automotive panel hemming method of claim 15, wherein, after the pressing, the dimple directly contacts a portion of a circumferentially continuous perimeter of the aperture, but does not directly contact the entire circumferentially continuous perimeter.

17. The automotive panel hemming method of claim 15, after the pressing, curing an adhesive to hold the first panel relative to the second panel.

18. The automotive panel hemming method of claim 15, wherein the dimple is an area of a first panel side edge that is displaced into the aperture relative to another area of the first panel side edge.

* * * * *

UNITED STATES PATENT AND TRADEMARK OFFICE
CERTIFICATE OF CORRECTION

PATENT NO. : 11,186,148 B2
APPLICATION NO. : 16/668037
DATED : November 30, 2021
INVENTOR(S) : Michael J. Gardynik et al.

It is certified that error appears in the above-identified patent and that said Letters Patent is hereby corrected as shown below:

In the Claims

In Claim 6, Column 5, Line 37; replace "claim 5" with --claim 1--

In Claim 7, Column 5, Line 41; replace "claim 5" with --claim 1--

In Claim 8, Column 5, Line 43; replace "claim 5" with --claim 1--

In Claim 9, Column 6, Line 1; replace "claim 5" with --claim 1--

In Claim 10, Column 6, Line 4; replace "claim 5" with --claim 1--

In Claim 12, Column 6, Line 11; replace "claim 5" with --claim 1--

In Claim 14, Column 6, Line 18; replace "claim 5" with --claim 1--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*